United States Patent
Chau et al.

(10) Patent No.: US 9,282,244 B2
(45) Date of Patent: Mar. 8, 2016

(54) CAMERA NON-TOUCH SWITCH

(71) Applicant: Microsoft Technology Licensing, LLC, Redmond, WA (US)

(72) Inventors: Seang Y. Chau, Los Altos, CA (US); Amy Aimei Han, Portola Valley, CA (US); Michael J. Lammers, Redwood City, CA (US); Sang-Kyun Han, Campbell, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/873,069

(22) Filed: Apr. 29, 2013

(65) Prior Publication Data
US 2014/0270689 A1    Sep. 18, 2014

Related U.S. Application Data

(63) Continuation-in-part of application No. 13/828,139, filed on Mar. 14, 2013.

(51) Int. Cl.
| | |
|---|---|
| *H04N 5/77* | (2006.01) |
| *H04N 5/232* | (2006.01) |
| *H04N 7/18* | (2006.01) |
| *H04N 5/76* | (2006.01) |

(52) U.S. Cl.
CPC ........... *H04N 5/23245* (2013.01); *H04N 7/188* (2013.01); *H04N 5/76* (2013.01)

(58) Field of Classification Search
CPC ......... H04N 5/77; H04N 5/772; H04N 5/232; H04N 5/9201; H04N 1/2112; G11B 27/34
See application file for complete search history.

(56) References Cited

U.S. PATENT DOCUMENTS

| | | |
|---|---|---|
| 3,305,148 A | 2/1967 | Zimmerman |
| 5,282,044 A | 1/1994 | Misawa et al. |
| 5,610,678 A | 3/1997 | Tsuboi et al. |
| 6,058,141 A | 5/2000 | Barger et al. |
| 6,168,057 B1 | 1/2001 | Schwabe |
| 6,252,389 B1 | 6/2001 | Baba et al. |
| 6,275,829 B1 | 8/2001 | Angiulo et al. |
| 6,558,050 B1 | 5/2003 | Ishibashi |
| 6,561,702 B1 | 5/2003 | Yik |
| 6,612,404 B2 | 9/2003 | Sweet et al. |

(Continued)

FOREIGN PATENT DOCUMENTS

| | | |
|---|---|---|
| CN | 202838971 | 3/2013 |
| EP | 0985899 | 3/2000 |

(Continued)

OTHER PUBLICATIONS

"Hall Effect Pushbutton Switches", Retrieved from <http://www.ottoexcellence.com/file.aspx?FileId=3337> on Mar. 20, 2013, 1 page.

(Continued)

*Primary Examiner* — William C Vaughn, Jr.
*Assistant Examiner* — Eileen Adams
(74) *Attorney, Agent, or Firm* — Danielle Johnston-Holmes; Micky Minhas; Wolfe-SBMC

(57) ABSTRACT

Various embodiments provide a wearable camera that can be worn by a user. In one or more embodiments, the wearable camera can include a non-touch switch that can be utilized to access and activate various camera functionality.

17 Claims, 6 Drawing Sheets

(56) References Cited

U.S. PATENT DOCUMENTS

| | | |
|---|---|---|
| D483,784 S | 12/2003 | Ting |
| 6,667,771 B1 | 12/2003 | Kweon |
| 6,680,748 B1 | 1/2004 | Monti |
| 6,711,297 B1 | 3/2004 | Chang et al. |
| 6,727,949 B1 | 4/2004 | Saruwatari et al. |
| 6,757,027 B1 | 6/2004 | Edwards et al. |
| 6,867,680 B1 | 3/2005 | Kulle |
| 6,904,185 B1 | 6/2005 | Wilkins et al. |
| 7,012,621 B2 | 3/2006 | Crosby et al. |
| 7,092,614 B2 | 8/2006 | Liebhold et al. |
| 7,116,440 B2 | 10/2006 | Eichhorn et al. |
| D534,939 S | 1/2007 | Sheehan et al. |
| 7,280,702 B2 | 10/2007 | Chang et al. |
| 7,326,869 B2 | 2/2008 | Flynn et al. |
| 7,454,711 B2 | 11/2008 | Angiulo et al. |
| 7,490,721 B2 | 2/2009 | Bishop |
| 7,574,129 B2 | 8/2009 | Tsukuda |
| 7,623,182 B2 | 11/2009 | Byrne et al. |
| 7,778,023 B1 | 8/2010 | Mohoney |
| 7,783,133 B2 | 8/2010 | Dunki-Jacobs et al. |
| 8,031,255 B2 | 10/2011 | Usami |
| 8,083,146 B2 | 12/2011 | Carlson et al. |
| 8,159,363 B2 | 4/2012 | Song |
| 8,159,541 B2 | 4/2012 | McLeod |
| 8,270,827 B2 | 9/2012 | Tse, Jr. |
| 8,315,602 B2 | 11/2012 | Fogel et al. |
| 8,322,215 B2 | 12/2012 | Lakich et al. |
| 8,330,854 B2 | 12/2012 | Kossin |
| 8,355,619 B2 | 1/2013 | Kato et al. |
| 8,363,121 B2 | 1/2013 | Maeng |
| 8,374,498 B2 | 2/2013 | Pastore |
| 8,411,050 B2 | 4/2013 | Zalewski |
| 8,514,292 B2 | 8/2013 | Cho |
| 8,515,241 B2 | 8/2013 | Forsyth et al. |
| 8,538,376 B2 | 9/2013 | Lee et al. |
| 8,587,670 B2 | 11/2013 | Wood et al. |
| 8,605,188 B2 | 12/2013 | Ishihara et al. |
| 8,979,398 B2 | 3/2015 | Han et al. |
| 9,066,007 B2 | 6/2015 | Chau et al. |
| 2002/0140849 A1 | 10/2002 | Slatter et al. |
| 2002/0186317 A1 | 12/2002 | Kayanuma |
| 2003/0081121 A1 | 5/2003 | Kirmuss |
| 2003/0234860 A1* | 12/2003 | Sung et al. ............. 348/143 |
| 2004/0056949 A1 | 3/2004 | Lin |
| 2004/0089814 A1 | 5/2004 | Cheatle |
| 2004/0105024 A1 | 6/2004 | Takahashi |
| 2004/0145613 A1 | 7/2004 | Stavely et al. |
| 2004/0155968 A1 | 8/2004 | Cheatle et al. |
| 2004/0169883 A1 | 9/2004 | Eichhorn et al. |
| 2004/0183912 A1 | 9/2004 | Szolyga et al. |
| 2004/0189691 A1 | 9/2004 | Jojic et al. |
| 2004/0218081 A1 | 11/2004 | Lohr et al. |
| 2004/0240005 A1 | 12/2004 | Kim |
| 2005/0093988 A1 | 5/2005 | Haas et al. |
| 2005/0100329 A1 | 5/2005 | Lao et al. |
| 2005/0140798 A1 | 6/2005 | Tashiro et al. |
| 2005/0207733 A1 | 9/2005 | Gargi |
| 2005/0248453 A1 | 11/2005 | Fetcher |
| 2006/0066753 A1 | 3/2006 | Gennetten et al. |
| 2006/0078215 A1 | 4/2006 | Gallagher |
| 2006/0140599 A1 | 6/2006 | Nomura et al. |
| 2006/0165160 A1 | 7/2006 | Winningstad et al. |
| 2006/0173560 A1 | 8/2006 | Widrow |
| 2006/0197843 A1 | 9/2006 | Yoshimatsu |
| 2006/0268162 A1 | 11/2006 | Kayanuma |
| 2007/0071423 A1 | 3/2007 | Fantone et al. |
| 2007/0214886 A1 | 9/2007 | Sheynblat |
| 2007/0291177 A1 | 12/2007 | Lahoz et al. |
| 2008/0055427 A1 | 3/2008 | Wendelrup |
| 2008/0136940 A1 | 6/2008 | Srikanth et al. |
| 2008/0165249 A1 | 7/2008 | DeKeyser |
| 2008/0180537 A1 | 7/2008 | Weinber et al. |
| 2008/0259174 A1 | 10/2008 | Nagao |
| 2008/0260291 A1 | 10/2008 | Alakarhu et al. |
| 2008/0313172 A1 | 12/2008 | King et al. |
| 2009/0115865 A1 | 5/2009 | Kamada et al. |
| 2009/0117946 A1 | 5/2009 | Tomasini et al. |
| 2009/0196493 A1 | 8/2009 | Widrow et al. |
| 2010/0026716 A1 | 2/2010 | Garbow et al. |
| 2010/0026839 A1* | 2/2010 | Border et al. ............. 348/231.2 |
| 2010/0027663 A1 | 2/2010 | Dai et al. |
| 2010/0053348 A1* | 3/2010 | Yoshimoto et al. ........ 348/218.1 |
| 2010/0079356 A1 | 4/2010 | Hoellwarth |
| 2010/0107126 A1 | 4/2010 | Lin et al. |
| 2010/0118158 A1 | 5/2010 | Boland et al. |
| 2010/0156676 A1 | 6/2010 | Mooring et al. |
| 2010/0175088 A1 | 7/2010 | Loebig et al. |
| 2010/0194682 A1 | 8/2010 | Orr et al. |
| 2010/0289904 A1 | 11/2010 | Zhang et al. |
| 2010/0306402 A1 | 12/2010 | Russell et al. |
| 2010/0316369 A1 | 12/2010 | Pyle |
| 2011/0053641 A1 | 3/2011 | Lee et al. |
| 2011/0064129 A1 | 3/2011 | Bennett et al. |
| 2011/0070829 A1 | 3/2011 | Griffin et al. |
| 2011/0081143 A1 | 4/2011 | Kope et al. |
| 2011/0084661 A1 | 4/2011 | Saw |
| 2011/0149094 A1 | 6/2011 | Chen et al. |
| 2011/0152629 A1 | 6/2011 | Eaton et al. |
| 2011/0158623 A1 | 6/2011 | Cheng et al. |
| 2011/0211061 A1 | 9/2011 | Kossin |
| 2012/0063736 A1 | 3/2012 | Simmons et al. |
| 2012/0086819 A1 | 4/2012 | Wilson et al. |
| 2012/0140093 A1 | 6/2012 | Chuang |
| 2012/0206653 A1 | 8/2012 | Graves et al. |
| 2012/0263430 A1 | 10/2012 | Spitzer-Williams |
| 2012/0290840 A1 | 11/2012 | Willins |
| 2012/0297334 A1 | 11/2012 | Fagans et al. |
| 2012/0320224 A1 | 12/2012 | Miyoshi et al. |
| 2013/0014585 A1 | 1/2013 | Hetherington |
| 2013/0057489 A1 | 3/2013 | Morton et al. |
| 2013/0063538 A1 | 3/2013 | Hubner et al. |
| 2013/0069985 A1 | 3/2013 | Wong et al. |
| 2013/0148940 A1 | 6/2013 | Schmit et al. |
| 2013/0201344 A1 | 8/2013 | Sweet et al. |
| 2013/0229562 A1* | 9/2013 | Kamada et al. .......... 348/333.01 |
| 2013/0239001 A1 | 9/2013 | Maloney et al. |
| 2014/0071091 A1 | 3/2014 | Barak et al. |
| 2014/0072312 A1 | 3/2014 | Aldana et al. |
| 2014/0092299 A1 | 4/2014 | Phillips et al. |
| 2014/0191707 A1 | 7/2014 | Carreon et al. |
| 2014/0211031 A1 | 7/2014 | Han |
| 2014/0218493 A1 | 8/2014 | Dialameh et al. |
| 2014/0270688 A1 | 9/2014 | Han |
| 2014/0308031 A1 | 10/2014 | Han et al. |
| 2014/0320687 A1 | 10/2014 | Chau et al. |
| 2014/0333828 A1 | 11/2014 | Han et al. |
| 2014/0354880 A1 | 12/2014 | Han |
| 2015/0077552 A1 | 3/2015 | Yang et al. |
| 2015/0256749 A1 | 9/2015 | Frey et al. |
| 2015/0341559 A1 | 11/2015 | Kelder et al. |
| 2015/0341572 A1 | 11/2015 | Kelder et al. |
| 2015/0341591 A1 | 11/2015 | Kelder et al. |

FOREIGN PATENT DOCUMENTS

| | | |
|---|---|---|
| EP | 1571634 | 9/2005 |
| EP | 1921844 | 5/2008 |
| EP | 2091247 | 8/2009 |
| EP | 2160019 | 3/2010 |
| GB | 2456587 | 7/2009 |
| JP | 2006129391 | 5/2006 |
| JP | 2009110351 | 5/2009 |
| WO | WO-03005702 | 1/2003 |
| WO | WO-2014149664 | 9/2014 |

OTHER PUBLICATIONS

"Tap Detection", Retrieved from <http://www.kionix.com/tap-detection> on Mar. 19, 2013, Oct. 5, 2012, 1 page.

"User Guide Jawbone Era", Retrieved from <http://content.jawbone.com/static/www/pdf/manuals/era/jawbone-era-manual.pdf> on Mar. 18, 2013, 2010, 16 pages.

(56) References Cited

OTHER PUBLICATIONS

"Hall Effect Proximity Sensors Information", Retrieved from <http://www.globalspec.com/learnmore/sensors_transducers_detectors/proximity_presence_sensing/hall_effect_proximity_sensors> on Mar. 21, 2013, Aug. 31, 2012, 3 pages.
"TouchOSC", Retrieved from <http://hexler.net/docs/touchosc-configuration-options> on Mar. 19, 2013, May 26, 2011, 4 Pages.
"Hall Effect Sensor—SparkFun Electronics", Retrieved from <https://www.sparkfun.com/products/9312> on Mar. 21, 2013, Jan. 24, 2013, 7 pages.
Boyle, "Smartphone Accelerometers Could Be Used To Eavesdrop On Nearby Devices", Retrieved from <http://www.popsci.com/technology/article/2011-10/smartphones-could-become-spyphones-using-accelerometer-keystroke-detection> on Mar. 25, 2013, Oct. 19, 2011, 2 pages.
Chua, "Shock and Mute Pager Applications Using Accelerometers", Freescale Semiconductor, Inc., Rev. 5, Oct. 2006, 8 pages.
Jacobowitz, "Olympus Stylus 1050 SW", Retrieved from <http://www.pcmag.com/article2/0,2817,2333989,00.asp> on Mar. 21, 2013, Nov. 5, 2008, 6 pages.
Liu, et al., "uWave: Accelerometer-based Personalized Gesture Recognition and Its Applications", Pervasive and Mobile Computing, vol. 5, Issue 6, Available at <http://www.ruf.rice.edu/~mobile/publications/liu09percom.pdf>,Mar. 9, 2009, pp. 1-9.
Shiratori, et al., "Accelerometer-based User Interfaces for the Control of a Physically Simulated Character", Proceedings of the First ACM SIGGRAPH Conference and Exhibition on Computer Graphics and Interactive Techniques in Asia, vol. 27, No. 5, Available at <http://graphics.cs.cmu.edu/projects/wii/SIGGRAPHAsia2008_wii.pdf>,Dec. 10, 2008, 9 pages.
Zhang, "Using Accelerometer in Windows 8 Metro Style App and a Case Study of Tap Detection", Intel Corporation, Available at <http://software.intel.com/sites/default/files/m/d/4/1/d/8/Accelerometer_Case_Study_Win8.pdf>,Jul. 11, 2012, 20 pages.
Wilt, Adam "Review: Panasonic AG-AC160 and AG-HPX250 1/3" 3-MOS Camcorders", Retrieved from <http://provideocoalition.com/awilt/story/review_panasonic_ag-ac160_and_ag-hpx250_1_3_3-mos_camcorders/P1/> on Mar. 14, 2013, (Jan. 23, 2012), 32 pages.
Tomkins, et al., "Nikon D3100", Retrieved from <http://www.imaging-resource.com/PRODS/D3100/D3100VIDEO.HTM> on Mar. 14, 2013, (Dec. 13, 2010), 10 pages.
"Canon VIXIA HF R200 Full HD Camcorder with Dual SDXC Card", Retrieved from <http://www.amazon.com/Canon-VIXIA-R200-Camcorder-Slots/dp/B004HW7EAG> on Mar. 20, 2013, 9 pages.
"Canon: Ease of Use", Retrieved from: <http://www.usa.canon.com/cusa/consumer/standard_display/PS_Advantage_Ease> on Feb. 11, 2014, Mar. 12, 2011, 17 pages.
"DVR003 Mini Camera Stick HD Mini Camera and Video Recorder", Retrieved from <http://www.spyville.com/dvr003-lawmate-camstick.html> on Apr. 16, 2013, 2 pages.
"GeniusGuard™ Pen Spy Camera Recorder Model S3K", Retrieved from <http://www.eurekaplus.com/pen-spycam-recorder-s3k.html> on Apr. 16, 2013, 5 pages.
"Hi-Res "Pen Cap" Pocket Wearable Spy Camera", Retrieved from <https://www.dynaspy.com/hi-res-pen-cap-pocket-spy-camera-4gb-sd-memory> on Apr. 16, 2013, 3 pages.
"International Search Report and Written Opinion", Application No. PCT/US2013/013648, Apr. 11, 2014, 9 pages.
"Kodak Easyshare LS443 Zoom Digital Camera—User's Guide", Retrieved from <http://resources.kodak.com/support/shtml/en/manuals/urg00024/urg00024c8s1.shtml> on Mar. 20, 2013, 2 pages.
"Non-Final Office Action", U.S. Appl. No. 13/863,998, May 30, 2014, 9 pages.
"Non-Final Office Action", U.S. Appl. No. 13/871,905, May 15, 2014, 7 pages.
"'Panasonic V10 Camcorder Black'—Overview", Retrieved from <http://dicksmith.com.au/product/XG1221/?utm_medium=lasoo&utm_campaign=catalogue&utm_source=XG1221> on Mar. 20, 2013, 3 pages.
"Spy Mini DVR HDMI Camera", Retrieved from <http://www.balajitech.in/spy-camera.html> on Apr. 16, 2013, 28 pages.
Gallagher, "Using Vanishing Points to Correct Camera Rotation in Images", In 2nd Canadian Conference on Computer and Robot Vision, May 9, 2005, 8 pages.
Kaur, et al., "A Combined DWT-DCT approach to perform Video compression base of Frame Redundancy", In Proceedings: International Journal of Advanced Research in Computer Science and Software Engineering, vol. 2, Issue 9, M.M. University, Mullana (Ambala), Haryana, India,Sep. 2012, pp. 325-332.
Samadani, et al., "Representative Image Thumbnails: Automatic and Manual", In Proceeding of Human Vision and Electronic Imaging XIII, Jan. 24, 2008, 13 pages.
Terbush, "Looxcie 2 Review", Retrieved from <http://www.laptopmag.com/camcorders/looxcie-2.aspx> on Mar. 20, 2013, May 9, 2012, 3 pages.
Thammineni, et al., "Dynamic frame-rate selection for live Ibr Video Encoders using trial frames", In Proceedings: IEEE International Conference on Multimedia and Expo, Ittiam Systems (Pvt.) Ltd., Bangalore, India,Jun. 23, 2008, pp. 817-820.
Hodges, et al., "SenseCam: A Wearable Camera Which Stimulates and Rehabilitates Autobiographical Memory", Retrieved at <<http://research.microsoft.com/en-us/um/cambridge/projects/sensecam/pdf_files/Memory.pdf>>, In Journal of Memory, vol. 19, Issue 7, Oct. 2011, pp. 18.
Memoto., "Memoto Lifelogging Camera", Retrieved at <<http://www.kickstarter.com/projects/martinkallstrom/memoto-lifelogging-camera>>, Nov. 27, 2012, pp. 24.
"Using Vicon Revue", Retrieved at <<https://www.viconrevue.com/faqs/documents/UsingViconRevuev10_final.pdf>>, Retrieved Date: Apr. 30, 2013, pp. 41.
"Final Office Action", U.S. Appl. No. 13/871,905, Sep. 23, 2014, 6 pages.
"Images of Nokia 6555 Mobile Phone", In: "Images of Nokia 6555 Mobile Phone", XP055143661, figures 1, 2, Oct. 1, 2014, 1 page.
"International Search Report and Written Opinion", Application No. PCT/US2014/022896, Jun. 16, 2014, 13 Pages.
"International Search Report and Written Opinion", Application No. PCT/US2014/037406, Aug. 4, 2014, 13 Pages.
"International Search Report and Written Opinion", Application No. PCT/US2014/022892, Jul. 1, 2014, 14 Pages.
"International Search Report and Written Opinion", Application No. PCT/US2014/040110, Aug. 14, 2014, 14 Pages.
"International Search Report and Written Opinion", Application No. PCT/US2014/034065, Oct. 13, 2014, 18 pages.
"International Search Report and Written Opinion", Application No. PCT/US2014/035061, Jul. 28, 2014, 9 Pages.
"Nokia 6555 User Guide", retrieved from https://web.archive.org/web/20101225182824/http://www.fido.ca/cms/pdf/en/userguides/Nokia6555_en.pdf on Oct. 29, 2014, Dec. 25, 2010, pp. 17, 61, 62.
"Non-Final Office Action", U.S. Appl. No. 13/754,719, Jul. 9, 2014, 15 pages.
"Non-Final Office Action", U.S. Appl. No. 13/828,139, Aug. 7, 2014, 20 pages.
"Non-Final Office Action", U.S. Appl. No. 13/892,085, Sep. 4, 2014, 19 pages.
"Notice of Allowance", U.S. Appl. No. 13/863,998, Oct. 31, 2014, 4 pages.
Trumbo, "Samsung Flip Foldable", Retrieved from >http://www.concept-phones.comfsamsung/samsung-flip-foldable-phone-features-wrapscreen/, Jan. 9, 2012, 4 pages.
"Corrected Notice of Allowance", U.S. Appl. No. 13/871,905, Apr. 9, 2015, 2 pages.
"Final Office Action", U.S. Appl. No. 13/754,719, Jan. 30, 2015, 18 pages.
"Non-Final Office Action", U.S. Appl. No. 13/908,906, Mar. 12, 2015, 13 pages.
"Non-Final Office Action", U.S. Appl. No. 14/285,237, Apr. 24, 2015, 15 pages.

(56) References Cited

OTHER PUBLICATIONS

"Notice of Allowance", U.S. Appl. No. 13/871,905, Feb. 11, 2015, 4 pages.
"Second Written Opinion", Application No. PCT/US2014/013648, Jan. 27, 2015, 7 Pages.
"Supplemental Notice of Allowance", U.S. Appl. No. 13/863,998, Feb. 12, 2015, 2 pages.
"Written Opinion", Application No. PCT/US2014/022896, Feb. 12, 2015, 9 pages.
"Supplemental Notice of Allowance", U.S. Appl. No. 13/863,998, Nov. 26, 2014, 2 pages.
"Corrected Notice of Allowance", U.S. Appl. No. 13/871,905, May 22, 2015, 2 pages.
"Final Office Action", U.S. Appl. No. 13/892,085, May 7, 2015, 34 pages.
"International Preliminary Report on Patentability", Application No. PCT/US2014/035061, Jun. 23, 2015, 7 pages.
"Looxcie, User Manual for Android, Model LX1", Retrieved from <http://www.looxcie.com/wp-content/uploads/2012/10/LOOXCIE_LX1_UserManual_Android_15.pdf> on May 8, 2015, 2010, 36 pages.
"Non-Final Office Action", U.S. Appl. No. 13/754,719, May 13, 2015, 20 pages.
"Second Written Opinion", U.S. Appl. No. PCT/US2014/035061, Mar. 30, 2015, 7 pages.
"Second Written Opinion", U.S. Appl. No. PCT/US2014/037406, Apr. 16, 2015, 6 Pages.
Lopes,"Augmenting Touch Interaction Through Acoustic Sensing", Proceedings of the ACM International Conference on Interactive Tabletops and Surfaces, Jan. 1, 2011, 4 pages.
Robinson,"TapBack: Towards Richer Mobile Interfaces in Impoverished Contexts", Human Factors in Computing Systems, May 7, 2011, 4 pages.
"International Preliminary Report on Patentability", Application No. PCT/US2014/034065, Jun. 29, 2015, 10 pages.
"International Preliminary Report on Patentability", Application No. PCT/US2014/037406, Jul. 28, 2015, 12 pages.
"International Search Report and Written Opinion", Application No. PCT/US2015/031654, Sep. 14, 2015, 10 pages.
"International Search Report and Written Opinion", Application No. PCT/US2015/031652, Sep. 3, 2015, 9 Pages.
"International Search Report and Written Opinion", Application No. PCT/US2015/031653, Sep. 7, 2015, 9 Pages.
"Final Office Action", U.S. Appl. No. 13/754,719, Nov. 12, 2015, 19 pages.
"Final Office Action", U.S. Appl. No. 13/908,906, Oct. 8, 2015, 11 pages.
"Final Office Action", U.S. Appl. No. 14/285,237, Oct. 27, 2015, 9 pages.
"International Preliminary Report on Patentability", Application No. PCT/US2014/040110, Sep. 9, 2015, 10 pages.
"Non-Final Office Action", U.S. Appl. No. 14/285,387, Oct. 30, 2015, 12 pages.
"Non-Final Office Action", U.S. Appl. No. 14/716,355, Oct. 21, 2015, 8 pages.
"Restriction Requirement", U.S. Appl. No. 14/285,483, Nov. 5, 2015, 6 pages.

* cited by examiner

CAMERA NON-TOUCH SWITCH

RELATED APPLICATION

This application is a continuation-in-part of and claims priority to U.S. patent application Ser. No. 13/828,139, filed on Mar. 14, 2013, the disclosure of which is incorporated by reference herein.

BACKGROUND

Physical buttons are not always an appealing feature to add to hardware, such as a camera. This is particularly true when the hardware or camera has a small form factor. Additional physical buttons can create a crowding situation on the hardware or camera and can lead to an unaesthetic appearance. Further, crowded buttons increase the likelihood that a user will inadvertently press the wrong button.

SUMMARY

This Summary is provided to introduce a selection of concepts in a simplified form that are further described below in the Detailed Description. This Summary is not intended to identify key features or essential features of the claimed subject matter.

Various embodiments provide a wearable camera that can be worn by a user. In one or more embodiments, the wearable camera can include a non-touch switch that can be utilized to access and activate various camera functionality.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
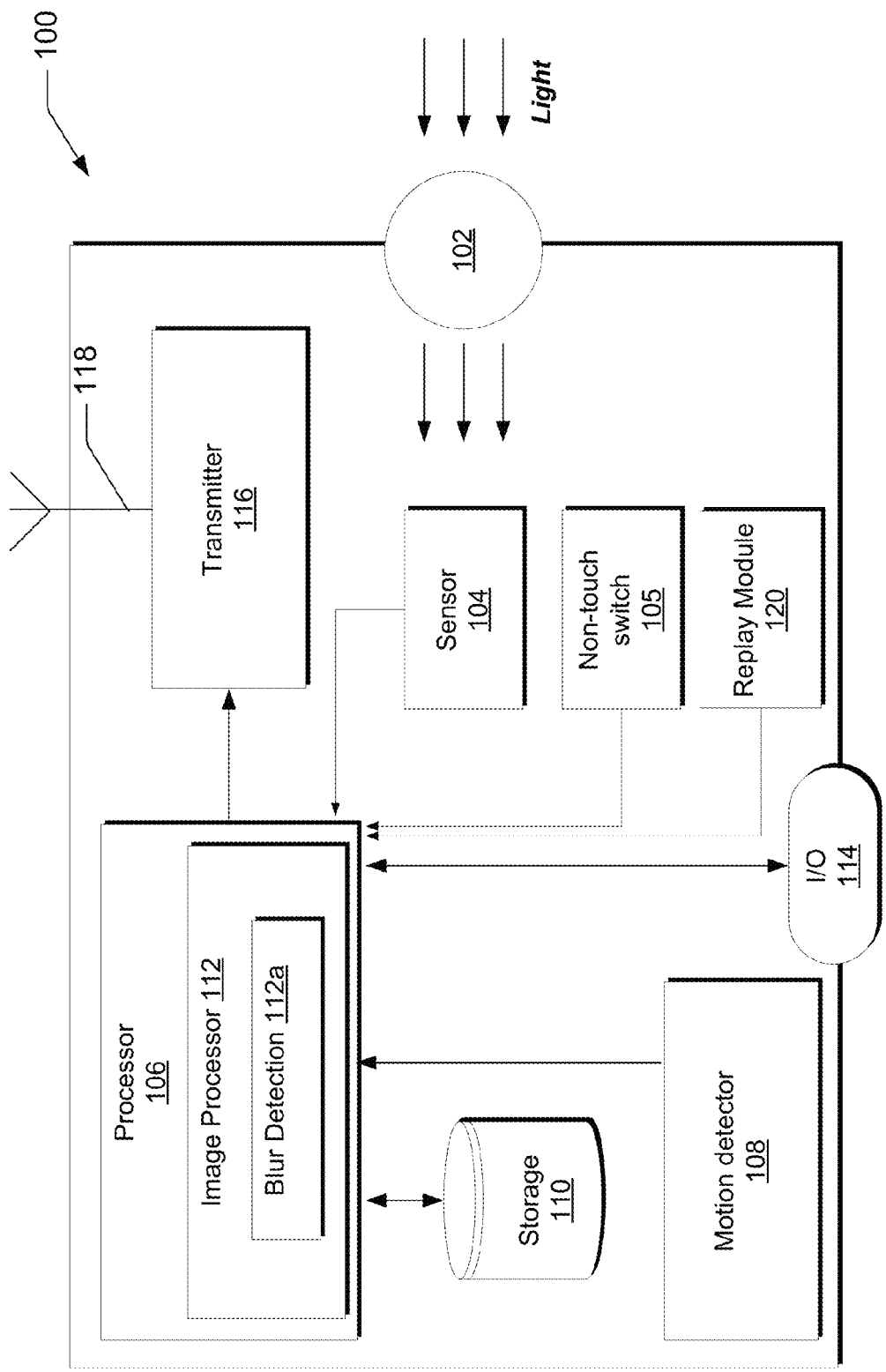
FIG. 1 is an example camera device in accordance with one or more embodiments.

Various embodiments provide a wearable camera that can be worn by a user. In one or more embodiments, the wearable camera can include a non-touch switch that can be utilized to access and activate various camera functionality.

The camera can be worn in any suitable location. For example, the camera can be worn on a user's head such as, a way of example and not limitation, a hat-mounted camera, glasses-mounted camera, headband-mounted camera, helmet-mounted camera, and the like. Alternately or additionally, the camera can be worn on locations other than the user's head. For example, the camera can be configured to be mounted on the user's clothing.

Various other embodiments provide a wearable camera that is mountable on a user's clothing. The camera is designed to be unobtrusive and user-friendly insofar as being mounted away from the user's face so as not to interfere with their view. In at least some embodiments, the camera includes a housing and a clip mounted to the housing to enable the camera to be clipped onto the user's clothing. The camera is designed to be lightweight with its weight balanced in a manner that is toward the user when clipped to the user's clothing.

In one or more embodiments, the camera includes a replay mode. When the replay mode is selected, the camera automatically captures image data, such as video or still images, and saves the image data to a memory buffer. In at least some embodiments, the size of the memory buffer can be set by the user to determine how much image data is to be collected. Once the memory buffer is full, the older image data is erased to make room for currently-captured image data. If an event occurs that the user wishes to memorialize through video or still images, a record button can be activated which saves the image data from the beginning of the memory buffer and continues recording until the user presses the record button again. Alternately, in embodiments that include the non-touch switch, such switch can be used to cause the image data to be saved from the beginning of the memory buffer and continue recording until the non-touch switch is again engaged. In this manner, if an event occurs, the user is assured of capturing the event from a time t−x, where x is the length of the memory buffer, in time.

In the discussion that follows, a section entitled "Example Environment" describes an example environment in which the various embodiments can be utilized. Next, a section entitled "Replay Functionality" describes an example replay mode in accordance with one or more embodiments. Following this, a section entitled "Camera Non-touch Switch" describes a camera switch with non-touch activation features in accordance with one or more embodiments. Next, a section entitled "Duel Encoding" describes an embodiment in which captured image data can be dual encoded in accordance with one or more embodiments. Next, a section entitled "Photo Log" describes an example photo log in accordance with one or more embodiments.

Consider now an example environment in which various embodiments can be practiced.

Example Environment

FIG. 1 illustrates a schematic of a camera device 100 in accordance with one or more embodiments. The camera device 100 includes a lens 102 having a focal length that is suitable for covering a scene to be pictured. In one embodiment, a mechanical device may be included with the lens 102 to enable auto or manual focusing of the lens. In another embodiment, the camera device 100 may be a fixed focus device in which no mechanical assembly is included to move the lens 102. A sensor 104 having a sensing surface (not shown) is also included to convert an image formed by the incoming light on the sensing surface of the sensor 104 into a digital format. The sensor 104 may include a charge-coupled device (CCD) or complementary metal oxide semiconductor (CMOS) image sensor for scanning the incoming light and creating a digital picture. Other technologies or devices may be used so long as the used device is capable of converting an image formed by the incoming light on a sensing surface into the digital form. Typically, these image detection devices determine the effects of light on tiny light sensitive devices and record the changes in a digital format.

The sensor 104 can serve as a non-touch switch to enable activation of one or more camera device features or functionalities, as will become apparent below. Alternately or additionally, the camera device can include a separate non-touch switch 105 to enable activation of one or more camera device features or functionalities as will become apparent below.

It should be appreciated that the camera device 100 may include other components such as a battery or power source and other processor components that are required for a processor to operate. However, to avoid obfuscating the teachings, these well-known components are being omitted. In one embodiment, the camera device 100 does not include a view finder or a preview display. In other embodiments, however, a preview display may be provided. The techniques described herein can be used in any type of camera, and are particularly effective in small, highly portable cameras, such as those implemented in mobile telephones and other portable user equipment. Thus, in one embodiment, the camera device 100 includes hardware or software for making and receiving phone calls. Alternately, the camera device 100 can be a dedicated, stand-alone camera.

In at least some embodiments, the camera device 100 further includes a motion detector 108 that can include an accelerometer and, in some embodiments, a gyroscope. The accelerometer is used for determining the direction of gravity and acceleration in any direction. The gyroscope may also be used either in addition to the accelerometer or instead of the accelerometer. The gyroscope can provide information about how the rotational angle of the camera device 100 changes over time. Any other type of sensor may be used to detect the camera's motion. Using the rotational angle, an angle of rotation of the camera device 100 may be calculated, if the camera device 100 is rotated.

Further included is an input/output (I/O) port 114 for connecting the camera device 100 to an external device, including a general purpose computer. The I/O port 114 may be used for enabling the external device to configure the camera device 100 or to upload/download data. In one embodiment, the I/O port 114 may also be used for streaming video or pictures from the camera device 100 to the external device. In one embodiment, the I/O port may also be used for powering the camera device 100 or charging a rechargeable battery (not shown) in the camera device 100.

The camera device 100 may also include an antenna 118 that is coupled to a transmitter/receiver (Tx/Rx) module 116. The Tx/Rx module 116 is coupled to a processor 106. The antenna 118 may be fully or partly exposed outside the body of the camera device 100. However, in another embodiment, the antenna 118 may be fully encapsulated within the body of the camera device 100. The Tx/Rx module 116 may be configured for Wi-Fi transmission/reception, Bluetooth transmission/reception or both. In another embodiment, the Tx/Rx module 116 may be configured to use a proprietary protocol for transmission/reception of the radio signals. In yet another embodiment, any radio transmission or data transmission standard may be used so long as the used standard is capable of transmitting/receiving digital data and control signals. In one embodiment, the Tx/Rx module 116 is a low power module with a transmission range of less than ten feet. In another embodiment, the Tx/Rx module 116 is a low power module with a transmission range of less than five feet. In other embodiments, the transmission range may be configurable using control signals received by the camera device 100 either via the I/O port 114 or via the antenna 118.

The camera device 100 further includes a processor 106. The processor 106 is coupled to, among other components, the sensor 104, the non-touch switch 105, and the motion detector 108. The processor 106 may also be coupled to storage 110, which, in one embodiment, is external to the processor 106. The storage 110 may be used for storing programming instructions for controlling and operating other components of the camera device 100. The storage 110 may also be used for storing captured media (e.g., pictures and/or videos). In another embodiment, the storage 110 may be a part of the processor 106 itself.

In one embodiment, the processor 106 may include an image processor 112. The image processor 112 may be a hardware component or may also be a software module that is executed by the processor 106. It may be noted that the processor 106 and/or the image processor 112 may reside in different chips. For example, multiple chips may be used to implement the processor 106. In one example, the image processor 112 may be a Digital Signal Processor (DSP). The image processor can be configured as a processing module, that is a computer program executable by a processor. In at least some embodiments, the processor 112 is used to process a raw image received from the sensor 104 based, at least in part, on the input received from the motion detector 108. Other components such as Image Signal Processor (ISP) may be used for image processing.

In one embodiment, the storage 110 is configured to store both raw (unmodified image) and the corresponding modified image. In one or more embodiments, the storage 110 can include a memory buffer, such as a flash memory buffer, that can be used as a circular buffer to facilitate capturing image data when the camera is set to a replay mode that is supported by replay module 120. The replay module 120 can be implemented in connection with any suitable hardware, software, firmware, or combination thereof. When the replay mode is selected, the camera automatically captures image data, such as video or still images, and saves the image data to the memory buffer. In at least some embodiments, the size of the memory buffer can be set by the user to determine how much image data is to be collected. If an event occurs that the user wishes to memorialize through video or still images, in some embodiments, a record button can be activated which saves the image data from the beginning of the memory buffer and continues recording until the user presses the record button again. Alternately, in at least some embodiments, input by way of the non-touch switch, as implemented by either the sensor 104 or the non-touch switch 105, can be used to save the image data from the beginning of the memory buffer and continue recording until an additional input is received by way of the non-touch switch. In this manner, if an event occurs, the user is assured of capturing the event from a time $t-x$, where x is the length of the memory buffer, in time.

A processor buffer (not shown) may also be used to store the image data. The pictures can be downloaded to the external device via the I/O port 114 or via the wireless channels using the antenna 118. In one embodiment, both unmodified and modified images are downloaded to the external device when the external device sends a command to download images from the camera device 110. In one embodiment, the camera device 100 may be configured to start capturing a series of images at a selected interval.

In one embodiment, a raw image from the sensor 104 is inputted to an image processor (such as an ISP) for image processing or blur detection. After image processing is applied to the image outputted by the image processor, the modified image is encoded. The image encoding is typically performed to compress the image data.

In an example embodiment, the camera device 100 may not include the components for processing the image captured by the sensor 104. Instead, the camera device 100 may include programming instructions to transmit the raw image after extracting the image from the sensor 104 to a cloud based processing system that is connected to the camera device 100 via the Internet or a local area network. The cloud based system is configured to receive the raw image and process the image or images as described above and below. The encoded image is then either stored in a selected cloud based storage or the image is sent back to the camera device 100 or to any other device according to a user configuration. The use of a cloud based image processing system can reduce a need for incorporating several image processing components in each camera device, thus making a camera device lighter, more energy efficient and cheaper.

In another example embodiment, instead of a cloud based image processing, the camera device 100 may send either a raw image or the image processed through an image processor to another device, e.g., a mobile phone or a computer. The image may be transmitted to the mobile phone (or a computer) for further processing via Wi-Fi, Bluetooth or any other type of networking protocol that is suitable for transmitting digital data from one device to another device. After the mobile device receives the image or images, according to one or more embodiments described herein, the produced image may be saved to local storage on the device, transferred for storage in a cloud based storage system, or transmitted to another device, according to user or system configurations.

In one embodiment, the native image processing system in the camera device 100 may produce images and/or videos in a non-standard format. For example, a 1200×1500 pixel image may be produced. This may be done by cropping, scaling, or using an image sensor with a non-standard resolution. Since methods for transforming images in a selected standard resolution are well-known, there will be no further discussion on this topic.

Various embodiments described above and below can be implemented utilizing a computer-readable storage medium that includes instructions that enable a processing unit to implement one or more aspects of the disclosed methods as well as a system configured to implement one or more aspects of the disclosed methods. By "computer-readable storage medium" is meant all statutory forms of media. Accordingly, non-statutory forms of media such as carrier waves and signals per se are not intended to be covered by the term "computer-readable storage medium".

As noted above, camera device 100 can assume any suitable form of wearable camera. The camera can be worn in any suitable location relative to a user. For example, the camera can be worn on a user's head such as, by a way of example and not limitation, a hat-mounted camera, glasses-mounted camera, headband-mounted camera, helmet-mounted camera, and the like. Alternately or additionally, the camera can be worn on locations other than the user's head. For example, the camera can be configured to be mounted on the user's clothing or other items carried by a user, such as a backpack, purse, briefcase, and the like.

In the example provided just below, a wearable camera is described in the context of a camera that is mountable on the user's clothing. It is to be appreciated and understood, however, that other types of non-clothing mountable, wearable cameras can be utilized without departing from the spirit and scope of the claimed subject matter.

Figure 2:
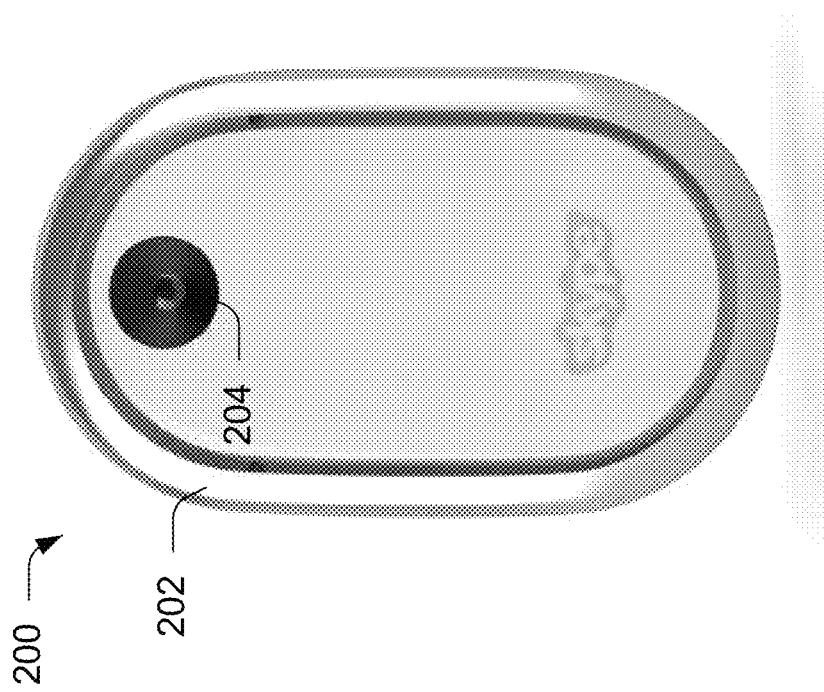
FIG. 2 illustrates an example camera device in accordance with one or more embodiments.
Figure 3:
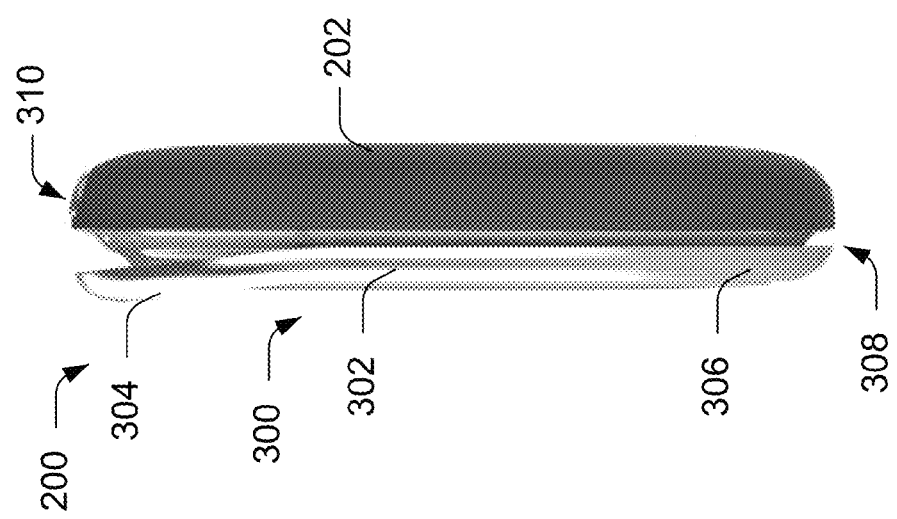
FIG. 3 illustrates an example camera device in accordance with one or more embodiments.

Moving on to FIGS. 2 and 3, consider the following. FIG. 2 illustrates an example camera device 200 in a front elevational view, while FIG. 3 illustrates the camera device 200 in a side elevational view. The camera device 200 includes a housing 202 that contains the components described in FIG. 1. Also illustrated is a camera lens 204 (FIG. 2) and a fastening device 300 (FIG. 3) in the form of a clip that operates in a manner that is similar to a clothespin. Specifically, the fastening device 300 includes a prong 302 with a body having a thumb-engageable portion 304. The body extends along an axis away from the thumb-engageable portion 304 toward a distal terminus 306. A spring mechanism, formed by the body or separate from and internal relative to the body, enables prong 302 to be opened responsive to pressure being applied to the thumb-engageable portion 304. When opened, a piece of clothing can be inserted into area 308. When the thumb-engageable portion 304 is released, the clothing is clamped in place by the prong 302 thereby securely mounting the camera device on a piece of clothing. For example, the camera device can be mounted, as described above, on a necktie, blouse, shirt, pocket, and the like.

In addition, camera device 200 can include a number of input buttons shown generally at 310. The input buttons can include, by way of example and not limitation, an input button to take a still picture, an input button to initiate the replay mode, an input button to initiate a video capture mode, and an input button to enable the user to adjust the buffer size that is utilized during the replay mode. In some embodiments, the input button to initiate the replay mode can be eliminated through the use of the non-touch switch as described below in more detail. It is to be appreciated and understood that the various input buttons can be located anywhere on the camera device 200.

It may be noted that even though the camera device 200 is shown to have a particular shape, the camera device 100 can be manufactured in any shape shape and size suitable and sufficient to accommodate the above described components of the camera device 100. The housing 202 of the camera device may be made of a metal molding, a synthetic material molding or a combination thereof. In other embodiments, any suitable type of material may be used to provide a durable and strong outer shell for typical portable device use.

In addition, the fastening device 300 can comprise any suitable type of fastening device. For example, the fastening device may be a simple slip-on clip, a crocodile clip, a hook, a Velcro or a magnet or a piece of metal to receive a magnet. The camera device 200 may be affixed permanently or semi-permanently to another object using the fastening device 300.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the camera device 200 may include a computer-readable medium that may be configured to maintain instructions that cause the camera's software and associated hardware to perform operations. Thus, the instructions function to configure the camera's software and associated hardware to perform the operations and in this way result in transformation of the software and associated hardware to perform functions. The instructions may be provided by the computer-readable medium to the camera device through a variety of different configurations.

One such configuration of a computer-readable medium is signal bearing medium and thus is configured to transmit the instructions (e.g., as a carrier wave) to the camera device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having considered an example operating environment in accordance with one or more embodiments, consider now a discussion of replay functionality and other features that can be provided by the camera device.

Replay Functionality

As noted above, camera device 200 includes a replay mode. When the replay mode is selected, as by the user pressing an input button associated with initiating the replay mode or through the use of the non-touch switch, the camera automatically captures image data, such as video or still images, and saves the image data to a memory buffer. In one or more embodiments, the memory buffer is a circular buffer that saves an amount of image data, for example video data. When the memory buffer is full of image data, it deletes the oldest image data to make room for newly recorded image data. This continues until either the user exits the replay mode or presses a button associated with initiating video capture, i.e. the "record" button or, in embodiments that include the non-touch switch, uses the non-touch switch to initiate video capture.

In at least some embodiments, the size of the memory buffer can be set by the user to determine how much image data is to be collected. As an example, the user might set the length of the memory buffer to correspond to 5 seconds, 30 seconds, 1 minute, 2 minutes, and longer.

Assume now that an event occurs that the user wishes to memorialize through video or still images. Assume also that the user has initiated the replay mode so that video data is currently being buffered in the memory buffer. By pressing the "record" button, the video data is now saved from the beginning of the memory buffer and recording continues until the user presses the record button again. In embodiments where the non-touch switch can be used in place of the "record" button, by activating the non-touch switch, the video data can now be saved from the beginning of the memory buffer and recording can continue until the user again activates the non-touch switch.

In this manner, if an event occurs, the user is assured of capturing the event from a time t−x, where x is the length of the memory buffer, in time. So, for example, if the user initially set the memory buffer to capture 2 minutes worth of video data, by pressing the "record" button or alternatively using the non-touch switch, the last 2 minutes of video data will be recorded in addition to the currently recorded video data.

In one or more embodiments, the memory buffer comprises flash memory. When the user presses the "record" button or uses the non-touch switch, and the camera device is in replay mode, a pointer is used to designate where, in flash memory, the beginning of the captured video data occurs, e.g., the beginning of the last 2 minutes of video data prior to entering the "record" mode. In other embodiments, the video data captured during replay mode and "record" mode can be written to an alternate storage location.

Figure 4:
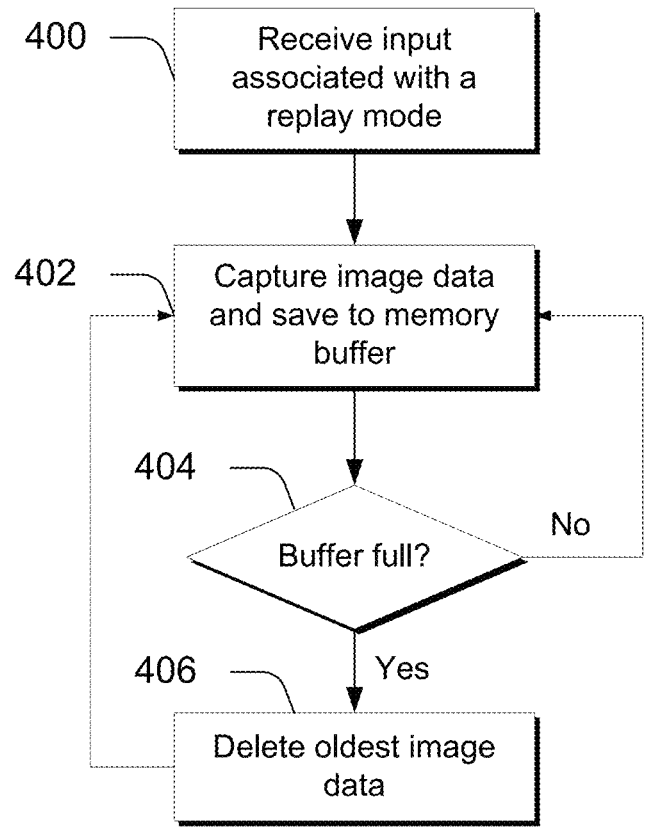
FIG. 4 is a flow diagram that describes steps in a method in accordance with one or more embodiments.

FIG. 4 is a flow diagram that describes steps in a method in accordance with one or more embodiments. The method can be performed in connection with any suitable hardware, software, firmware, or combination thereof. In at least some embodiments, the method is performed by a suitably-configured camera device such as the one described above.

Step 400 receives input associated with a replay mode. This step can be performed in any suitable way. For example, in at least some embodiments, this step can be performed by receiving input from the user via a suitable input device on the camera device. Responsive to receiving the input associated with the replay mode, step 402 captures image data and saves the image data to a memory buffer. Step 404 ascertains whether the buffer is full. If the buffer is not full, the method returns to step 402 and continues to capture image data and save image data to the memory buffer. If, on the other hand, the buffer is full, step 406 deletes the oldest image data in the memory buffer and returns to step 402 to capture subsequent image data.

This process continues until either the user presses the "record" button, or in alternate embodiments the non-touch switch, or exits the replay mode.

Figure 5:
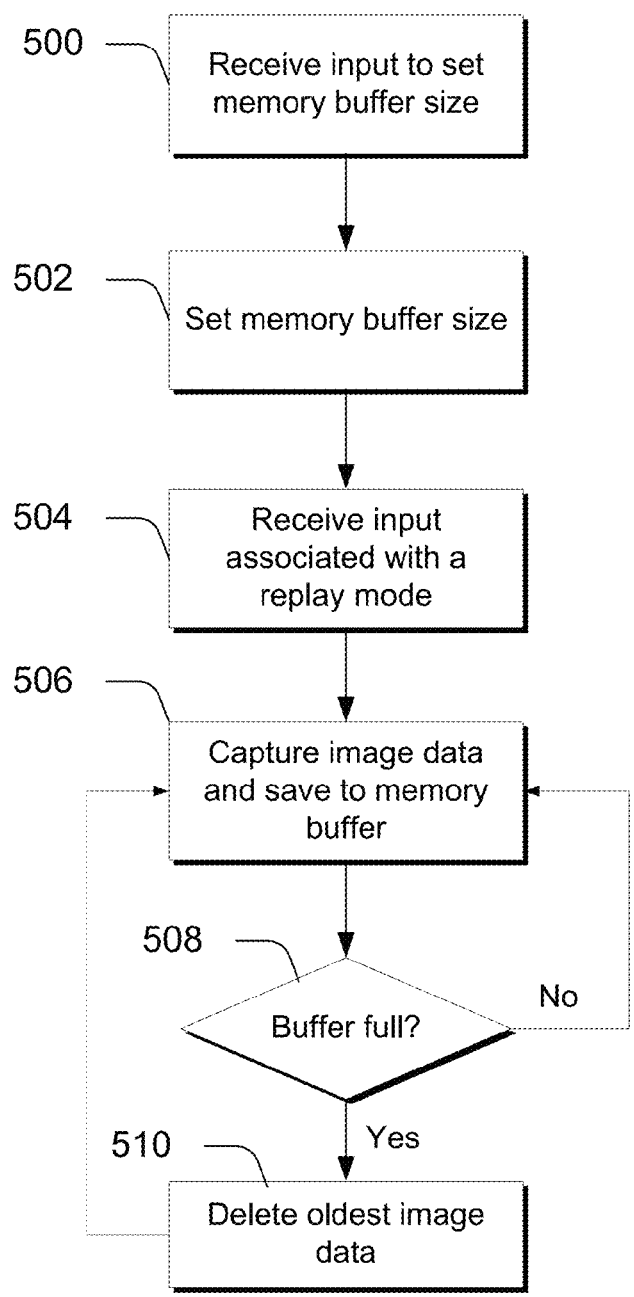
FIG. 5 is a flow diagram that describes steps in a method in accordance with one or more embodiments.

FIG. 5 is a flow diagram that describes steps in another method in accordance with one or more embodiments. The method, which allows a user to set the camera device's memory buffer size, can be performed in connection with any suitable hardware, software, firmware, or combination thereof. In at least some embodiments, the method is performed by a suitably-configured camera device such as the one described above.

Step 500 receives input to set a memory buffer size. This step can be performed in any suitable way. For example, in at least some embodiments, the step can be performed by receiving user input by way of a suitably-configured input mechanism such as a button on the camera device. Responsive to receiving this input, step 502 sets the memory buffer size.

Step 504 receives input associated with a replay mode. This step can be performed in any suitable way. For example, in at least some embodiments, this step can be performed by receiving input from the user via a suitable input device on the camera device. Responsive to receiving the input associated with the replay mode, step 506 captures image data and saves the image data to a memory buffer. Step 508 ascertains whether the buffer is full. If the buffer is not full, the method returns to step 506 and continues to capture image data and save image data to the memory buffer. If, on the other hand, the buffer is full, step 510 deletes the oldest image data in the memory buffer and returns to step 506 to capture subsequent image data.

This process continues until either the user presses the "record" button, or in alternate embodiments uses the non-touch switch, or exits the replay mode.

Figure 6:
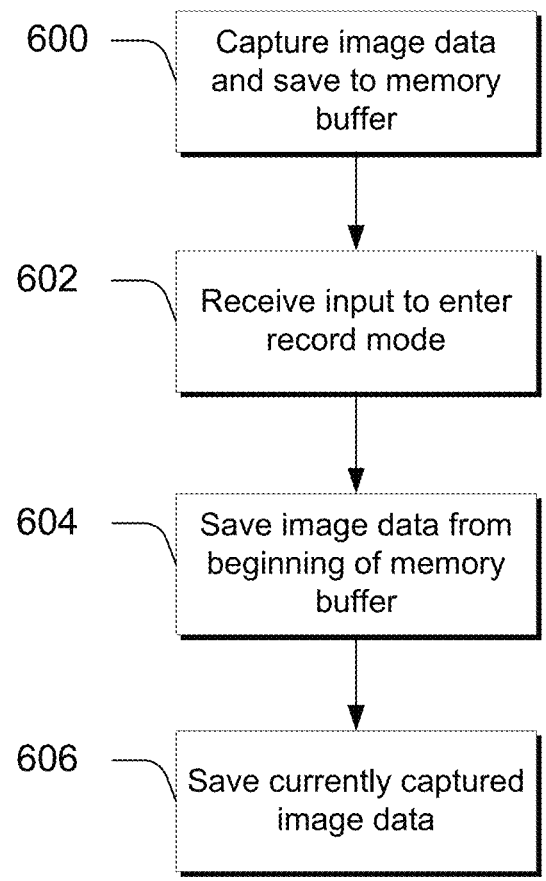
FIG. 6 is a flow diagram that describes steps in a method in accordance with one or more embodiments.

FIG. 6 is a flow diagram that describes steps in another method in accordance with one or more embodiments. The method can be performed in connection with any suitable hardware, software, firmware, or combination thereof. In at least some embodiments, the method is performed by a suitably-configured camera device such as the one described above.

Step 600 captures image data and saves the image data to a memory buffer. The step can be performed in any suitable way. For example, the step can be performed as described in connection with FIG. 4 or 5. Step 602 receives input to enter the camera device's record mode. This step can be performed, for example, by receiving user input by way of a "record" button. In alternate embodiments, a non-touch switch can be used in place of the "record" button when in the replay mode. The non-touch switch can be used to receive input to enter the camera device's record mode. Various examples of non-touch switches are described below in the section entitled "Non-Touch Switches." Responsive to receiving the input to enter record mode, step 604 saves image data from the beginning of the memory buffer. This step can be performed in any suitable way. For example, the step can be performed by setting a pointer to point to the beginning of the memory buffer. Step 606 saves currently captured image data in addition to the image data from the beginning of the memory buffer. This step can be performed until the user presses the "record" button once more. Alternately, in embodiments that include a non-touch switch, the step can be performed by receiving input by way of the non-touch switch.

Having considered an example replay mode and how it can be implemented with a suitably hiding configured camera device, consider now aspects of a camera non-touch switch.

Camera Non-Touch Switch

In one or more embodiments, the camera device can include a non-touch switch that can be utilized to access and activate various camera functionality. In the example described just above, the non-touch switch can be utilized to access the replay mode. Alternately or additionally, the non-touch switch can be utilized to access and activate other various camera functionality. Utilization of a non-touch switch can enable the number of hardware buttons on the camera device to be reduced. This, in turn, can lead to a more simplified construction that reduces material used to construct the camera device such as input button gaskets, assembly layers utilized in connection with input buttons, and the like.

Before considering various types of non-touch switches that can be employed in connection with the above-described camera device, consider a use scenario which illustrates the utility of such a switch. Assume that a user has turned their camera device on so that it is capturing image data in the replay mode and has attached their camera to themselves in some manner. For example, the user may have clipped the camera on their shirt or mounted it on a hat or helmet. Now, as a user progresses throughout the day, assume that an interesting event occurs that they wish to capture. Because the user is moving around and/or access to the camera device's hardware buttons may be challenging because of the user's movement, they can activate the replay mode using the non-touch switch. Specifically, by interacting with the camera device's non-touch switch, the user can cause the camera device to enter the replay mode and capture the video data that has been buffered in the memory buffer, as well as the currently-captured video data as described above.

In some instances, the non-touch switch allows for less precision in order to activate the camera device's functionality which, in the example above, is the replay mode functionality. So, active users who are on the go need not worry about fumbling around to find a particular hardware button. Rather, through the non-touch switch as described above and below, the user can access camera functionality in a manner that is less precise than that utilized by a hardware button.

As noted above, the non-touch switch can comprise any suitably-configured switch that can be utilized to access and activate various camera functionality without necessarily relying on physical touch. That is to say, while some touch can occur when utilizing the non-touch switch, the non-touch switch does not rely on touch in order to be activated.

In at least some embodiments, the non-touch switch can be implemented by the camera device's sensor, such as sensor 104, which receives light that enters the camera. Specifically, in these embodiments, the non-touch switch can be activated by a user briefly covering the camera lens 102 to block light from entering the camera and being sensed by sensor 104. When this occurs, the camera device's processor recognizes the sudden change from light to dark as a trigger to access and activate an associated camera device functionality.

In at least other embodiments, the non-touch switch can be implemented by a separate light aperture through which light enters the camera. By briefly covering the light aperture, the non-touch switch, such as non-touch switch 105 (FIG. 1) can be activated and the camera device's functionality can be accessed.

In yet other embodiments, various types of proximity sensors can be utilized to implement a non-touch switch, such as non-touch switch 105. Such proximity sensors can utilize any suitable type of technology including, by way of example and not limitation, electromagnetic field emission, electromagnetic radiation such as infrared light, capacitive sensors, inductive sensors, and the like.

Having considered an example camera non-touch switch and how it can be implemented with a suitably hiding configured camera device, consider now aspects of a dual encoding process.

Dual Encoding

In one or more embodiments, the camera device's processor 106 (FIG. 1) is configured to encode image data at different levels of resolution. For example, the camera device can encode image data at a low level of resolution and at a high level of resolution as well. Any suitable levels of resolution can be utilized. In at least some embodiments, the low level of resolution is Quarter-VGA (e.g., 320×240) and the high level of resolution is 720p (e.g., 1280×720).

Encoding image data at different resolutions levels can enhance the user's experience insofar as giving the user various options to transfer the saved image data. For example, at lower resolution levels, the captured image data can be streamed to a device such as a smart phone. Alternately or additionally, at higher resolution levels, when the user has Wi-Fi accessibility, they can transfer the image data to a network device such as a laptop or desktop computer.

Having considered a dual encoding scenario, consider now aspects of a photo log that can be constructed using the principles described above.

Photo Log

Photo log refers to a feature that enables a user to log their day in still photos at intervals of their own choosing. So, for example, if the user wishes to photo log their day at every 3 minutes, they can provide input to the camera device so that every 3 minutes the camera automatically takes a still photo and saves it. At the end of the day, the user will have documented their day with a number of different still photos.

In at least some embodiments, the photo log feature can work in concert with the replay mode described above. For example, if the user has entered the replay mode by causing image data to be captured and saved to the memory buffer, the camera device's processor can process portions of the captured video data at defined intervals to provide the still photos. This can be performed in any suitable way. For example, the camera device's processor can process the video data on the camera's photosensor and read predefined areas of the photosensor to process the read areas into the still photos. In some instances the photo format is a square format so that the aspect ratio is different from that aspect ratio of the video data.

CONCLUSION

Various embodiments provide a wearable camera that can be worn by a user. In one or more embodiments, the wearable camera can include a non-touch switch that can be utilized to access and activate various camera functionality.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A camera device comprising:
    a housing;
    a camera lens supported by the housing and configured to enable capture of image data;
    a fastening device on the housing and configured to enable the camera device to be wearable by and attachable to a user;
    a non-touch switch configured to receive input to access and activate a camera device functionality, wherein the non-touch switch comprises a light sensor that receives light that enters the wearable, attachable camera device;
    a processor configured to:
        receive an input from the non-touch switch;
        access the camera device functionality associated with the non-touch switch; and
        activate the camera functionality.

2. The camera device of claim 1, wherein the light sensor is configured to enable image capture.

3. The camera device of claim 1, wherein the light sensor is configured to enable image capture and the processor is configured to access the camera device functionality based on an user input that covers the non-touch switch.

4. The camera device of claim 1 further comprising:
    a memory buffer within the housing; and
    a replay module within the housing and coupled to the memory buffer, the replay module being configured to enable a replay mode in which the camera device automatically captures image data and saves the image data to the memory buffer and, when the memory buffer is full, erases older image data to make room for currently-captured image data.

5. The camera device of claim 1, further comprising:
    a memory buffer within the housing; and
    a replay module within the housing and coupled to the memory buffer, the replay module being configured to implement the camera device functionality to enable a replay mode in which the camera device automatically captures image data and saves the image data to the memory buffer and, when the memory buffer is full, erases older image data to make room for currently-captured image data;
    the non-touch switch, responsive to receiving input to access and activate the camera device functionality, being configured to cause:
        image data from the beginning of the memory buffer to be saved, and
        currently-captured image data to be saved.

6. A computer-implemented method comprising:
    capturing, with a wearable camera device, image data and saving the image data to a memory buffer, the wearable camera device being attachable to a user;
    receiving, via a non-touch switch, input to enter a record mode of the camera device, the non-touch switch comprising a light sensor that receives light that enters the wearable attachable camera device;
    responsive to receiving the input to enter the record mode, saving image data from the beginning of the memory buffer; and
    saving currently captured image data in addition to the image data from the beginning of the memory buffer.

7. The method of claim 6, wherein the light sensor is configured to enable image capture.

8. The method of claim 6, wherein said receiving input comprises receiving user input that covers the light sensor.

9. The method of claim 6, wherein the camera device is configured to be worn on a location other than a user's clothing.

10. The method of claim 6, wherein the camera device is configured to be worn on a user's clothing.

11. A camera device comprising:
    a housing;
    a camera lens supported by the housing and configured to enable capture of image data;
    a fastening device on the housing and configured to enable the camera device to be wearable by, and attachable on clothing of a user;
    a non-touch switch, in the form of a light sensor, configured to receive input to access and activate a camera device functionality, the light sensor being configured to receive light that enters the camera;
    a processor configured to:
        receive an input from the non-touch switch;
        access a functionality associated with the non-touch switch; and
        activate the camera functionality.

12. The camera device of claim 11, wherein the light sensor is configured to enable image capture.

13. The camera device of claim 12, wherein the input to access and activate a camera device functionality comprises user input that covers the light sensor.

14. The camera device of claim 11, wherein the light sensor is not configured to enable image capture.

15. The camera device of claim 11, wherein the light sensor is configured to enable image capture and the input to access and activate a camera device functionality comprises user input that covers the light sensor.

16. The camera device of claim 11, wherein the light sensor is not configured to enable image capture and the input to access and activate a camera device functionality comprises user input that covers the light sensor.

17. A camera device comprising:
    a housing;
    a camera lens supported by the housing and configured to enable capture of image data;
    a fastening device on the housing and configured to enable the camera device to be wearable by, and attachable to a user;
    a non-touch switch configured to receive input to access and activate a camera device functionality, wherein the non-touch switch comprises a proximity sensor;
    a processor configured to:
        receive an input from the non-touch switch;
        access the camera device functionality associated with the non-touch switch; and
        activate the camera functionality.

* * * * *